(12) United States Patent
Ohmura

(10) Patent No.: US 8,628,445 B2
(45) Date of Patent: Jan. 14, 2014

(54) VEHICLE-DRIVING SYSTEM

(71) Applicant: Honda Motor Co., Ltd., Tokyo (JP)

(72) Inventor: Jun Ohmura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/765,374

(22) Filed: Feb. 12, 2013

(65) Prior Publication Data

US 2013/0217533 A1 Aug. 22, 2013

(30) Foreign Application Priority Data

Feb. 21, 2012 (JP) ................................ 2012-035516

(51) Int. Cl.
*F16H 48/06* (2006.01)

(52) U.S. Cl.
USPC .......................................... 475/252; 74/606 R

(58) Field of Classification Search
USPC ................. 475/220, 230, 240, 252, 331, 339; 74/606 R
See application file for complete search history.

(56) References Cited

U.S. PATENT DOCUMENTS

| 827,095 | A | * | 7/1906 | Gray | 475/252 |
| 2,651,215 | A | * | 9/1953 | Schoenrock | 475/249 |
| 3,611,832 | A | * | 10/1971 | Vollmer | 475/198 |
| 3,768,336 | A | * | 10/1973 | Wharton | 475/252 |
| 2011/0045934 | A1 | | 2/2011 | Biermann et al. | |

FOREIGN PATENT DOCUMENTS

| DE | 10 2007 004 710 A1 | 8/2008 |
| JP | 03-043150 | 4/1991 |
| JP | 2000-304122 | 11/2000 |
| JP | 2003-014055 | 1/2003 |
| JP | 2007-218399 | 8/2007 |

OTHER PUBLICATIONS

Japanese Office Action dated Nov. 12, 2013.

* cited by examiner

*Primary Examiner* — Justin Holmes
(74) *Attorney, Agent, or Firm* — Arent Fox LLP

(57) ABSTRACT

A vehicle driving system includes, a first drive shaft and a second drive shaft; a differential mechanism; a drive input member which inputs a power from a driving power source to the differential mechanism; and a fastening member that fastens the differential mechanism and the drive input member together, wherein the differential mechanism includes: a first sun gear; a second sun gear; a first pinion gear; a second pinion gear that is engaged to the second sun gear and the first pinion gear; and a carrier that is fastened to the drive input member and rotatably supports the first pinion gear and the second pinion gear; and, wherein a spline joint portion that causes the carrier and the drive input member to be fitted in a spline manner is provided at an outer peripheral end portion of the carrier and an inner peripheral end portion of the drive input member.

3 Claims, 4 Drawing Sheets

VEHICLE-DRIVING SYSTEM

BACKGROUND OF THE INVENTION

1. Field of the Invention

The present invention relates to a vehicle driving system.

Priority is claimed on Japanese Patent Application No. 2012-035516, filed Feb. 21, 2012, the content of which is incorporated herein by reference.

2. Description of Related Art

As a vehicle driving system that transmits a turning force thereof while allowing differential motion between right and left axles of a vehicle, a configuration is known that includes a so-called double pinion double sun type differential mechanism (hereinafter simply referred to as a differential mechanism) having two sun gears and two pinion gears, and a drive gear that is disposed on the outer peripheral side with respect to the differential mechanism and inputs power from the driving power source to the differential mechanism (for example, refer to German Patent Application, Publication No. 102007004710).

More specifically, the differential mechanism includes first and second sun gears which are respectively fixed to both axles, a first pinion gear which is engaged to the first sun gear, a second pinion gear which is engaged to the second sun gear and the first pinion gear and a carrier which rotatably supports the first pinion gear and the second pinion gear. The carrier has a bearing portion which rotatably supports the first pinion gear and the second pinion gear, and a mounting piece which is disposed out of phase with respect to the bearing portion.

The drive gear is arranged so as to enclose the outer side of the carrier in the radial direction, and a gear portion for transmitting the driving power of the driving power source to the carrier is formed on the outer peripheral surface thereof. In addition, on the inner peripheral surface of the drive gear, the mounting piece is disposed to protrude inward in the radial direction.

Then, in a state where the mounting piece of the differential mechanism and the mounting piece of the drive gear are placed face-to-face in the axial direction, the differential mechanism and the drive gear are fixed by fastening members such as bolts. Accordingly, the driving power of the drive gear is configured to be transmitted to the carrier as a friction force between the respective mounting pieces or a shearing force to the fastening members.

SUMMARY OF THE INVENTION

Incidentally, when transmitting torque from a driving power source (drive gear side) to a carrier, in order to efficiently transmit the torque by preventing circumferential slipping (backlash) between the drive gear and the carrier, it is necessary to such as improve a friction force between mounting pieces by strengthening the fastening power of fastening members.

However, in the above-described configuration of German Patent Application, Publication No. 102007004710, a bearing portion which supports a pinion gear, and the mounting piece which is fastened by the fastening members are disposed out of phase with each other on the same circumference of the carrier. Accordingly, there is a limit to the number of fastening members which can be installed on the mounting piece.

In contrast, it is also considered that the fastening power is strengthened by increasing the size of the fastening members themselves.

However, there is a limit in securing a bottom wall thickness of the drive gear and in increasing only the sizes of the fastening members without decreasing the outside diameter of a sun gear. Consequently, there is a problem in that sufficient fastening power cannot be secured in any case.

Accordingly, the present invention is made in consideration of the problem, and an object thereof is to provide a vehicle driving system which enables weight reduction, compactness, and robust assembly of a drive input member with a carrier.

In order to achieve the object, the vehicle-driving system of the invention employs the following.

(1) A vehicle-driving system according to an aspect of the invention includes, a first drive shaft and a second drive shaft that are disposed on the right and left of a vehicle; a differential mechanism that allows a differential motion between the first drive shaft and the second drive shaft; a drive input member that is disposed at an outer peripheral side with respect to the differential mechanism, and inputs a power from a driving power source to the differential mechanism; and a fastening member that fastens the differential mechanism and the drive input member together, wherein the differential mechanism includes: a first sun gear that is connected to the first drive shaft; a second sun gear that is connected to the second drive shaft; a first pinion gear that is engaged to the first sun gear; a second pinion gear that is engaged to the second sun gear and the first pinion gear; and a carrier that is fastened to the drive input member and rotatably supports the first pinion gear and the second pinion gear; and, wherein a spline joint portion that causes the carrier and the drive input member to be fitted in a spline manner is provided at an outer peripheral end portion of the carrier and an inner peripheral end portion of the drive input member.

(2) The vehicle-driving system according to the aspect of (1), the fastening member may be arranged out of phase with the spline joint portion in the circumferential direction.

(3) The vehicle-driving system according to the aspect of (1) or (2), the carrier may include a first carrier member and a second carrier member that support the first pinion gear and the second pinion gear by pinching in an axial direction, the spline joint portion may include: a internal spline that is formed at the inner peripheral end portion of the drive input member; and external splines that are respectively formed at outer peripheral end portions of the first carrier member and the second carrier member, and are fitted into the internal spline in the spline manner; and one external spline among the external splines may be fitted into one end side of the internal spline of the drive input member in the axial direction, and another external spline may be fitted into another end side of the internal spline in the axial direction.

(4) The vehicle-driving system according to any one of the aspect of (1) to (3), the spline joint portion may have an aligned large diameter and center alignment of the drive input member and the carrier may be performed by the spline joint portion.

According to the vehicle-driving system according to (1) of the invention, the driving power (shearing force and the like) which acts between the carrier and the drive input member can be supported by the spline joint portion. Accordingly, compared to a case where the carrier and the drive input member are fastened by only the fastening member in the related art, the shearing force or the like acting on the fastening member can be decreased.

In addition, since it is not necessary to secure the size or the number of the fastening members, there is no need to secure a space for disposing the fastening members. Therefore, weight reduction, compactness, and robust assembly of a drive input member with a carrier can be achieved.

According to the vehicle-driving system according to (2) of the invention, compared to a case where the fastening member and the spline joint portion are formed in the same phase (a case where the spline joint portion is formed further to the outside with respect to the fastening portion), an increase in size in the radial direction can be prevented by forming the fastening member and the spline joint portion out of phase with each other. Accordingly, a more compact vehicle-driving system can be achieved.

Incidentally, in a case where a gear portion of the drive input member is configured of a helical gear, when the driving power is transmitted from the driving power source to the drive input member, for example, a thrust load is often generated from the drive input member toward the differential mechanism side. In this case, the thrust load generated in the drive input member acts so as to collapse in the radial direction of the drive input member with a fastening portion of the carrier as a starting point.

In contrast, according to a configuration of the present invention, since the external splines of each carrier member are spline-fitted into both end portions in the axial direction of the internal spline of the drive input member, it is possible to regulate the above-described collapse in the radial direction of the drive input member. Accordingly, it is possible to suppress the occurrence of deviations in engagement between the drive input member and the driving power source and the like, and thereby it is possible to suppress adverse effects such as degradation of strength or durability, and the occurrence of such as sound or vibration that result from the occurrence of deviations.

According to the vehicle-driving system according to (4) of the invention, it is possible to accurately assemble the drive input member and the carrier without using a separate body such as a knock-pin, a positioning jig or the like in center alignment of the drive input member and the carrier.

DESCRIPTION OF EMBODIMENTS

Figure 1:
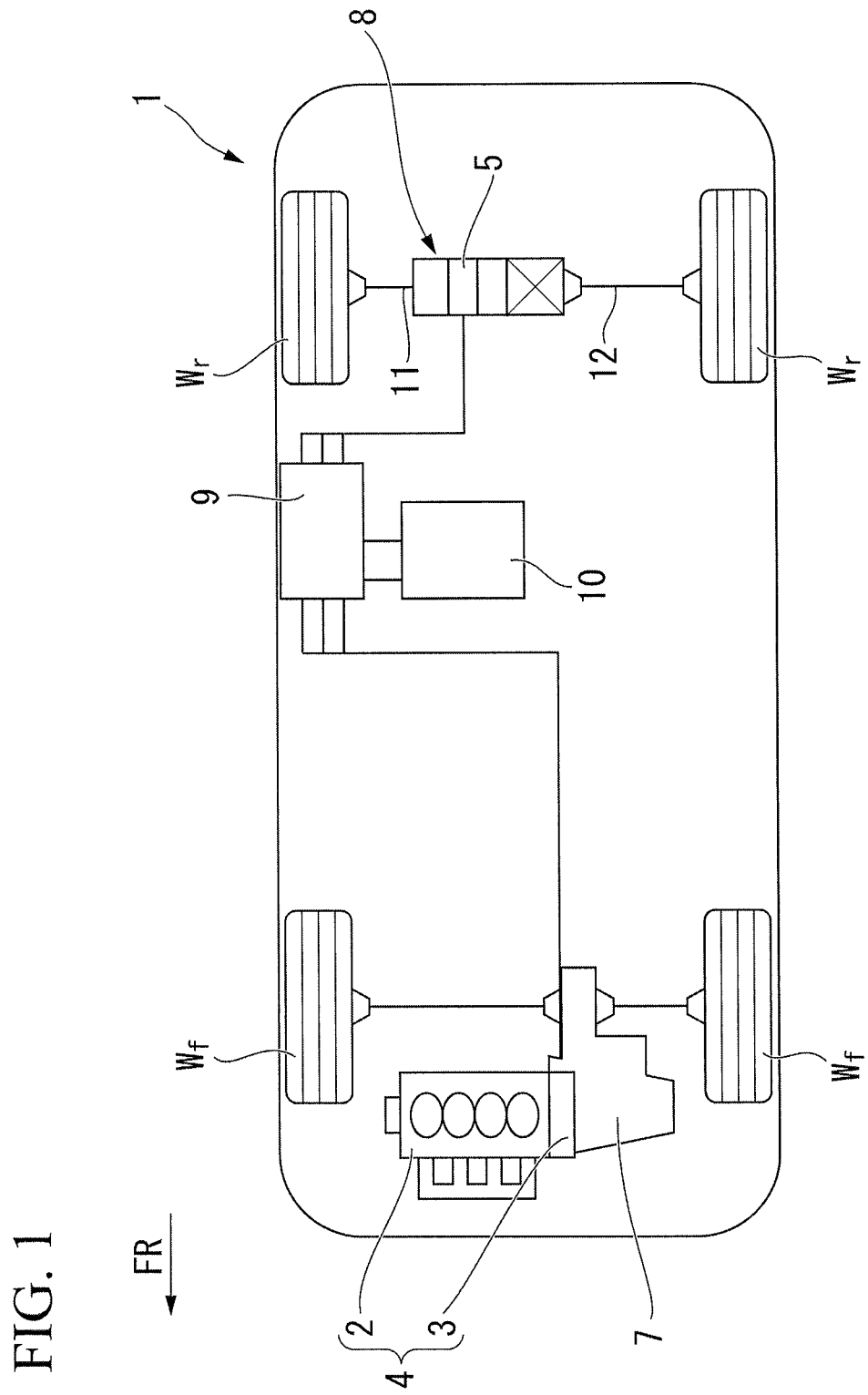
FIG. 1 is a schematic configuration diagram illustrating a layout of a vehicle according to the present embodiment.

Next, an embodiment of the present invention will be described with reference to the accompanying drawings.
FIG. 1 is a schematic configuration diagram illustrating a layout of a vehicle.
A vehicle 1 illustrated in FIG. 1 is a AWD (All-Wheel-Drive) hybrid vehicle, for example, and includes a drive unit 4 which is arranged at the front (FR) side and to which an internal combustion engine 2 and a front side motor 3 are connected in series, and a rear side motor (driving power source) 5 which is arranged at the rear side and which drives axles 11 and 12.
A transmission 7 such as an automatic transmission or CVT is connected to the drive unit 4, and the power of the drive unit 4 is transmitted to a front wheel Wf via the transmission 7. On the other hand, a vehicle driving system 8 (hereinafter simply referred to as a driving system 8) is integrally mounted at the rear side motor 5, and the power of the rear side motor 5 is transmitted to a rear wheel Wr via the driving system 8.

Each of the motors 3 and 5 is connected to a high voltage battery 10 via a power drive unit 9 (hereinafter simply referred to as PDU 9). An electric power supply from the battery 10 to each of the motors 3 and 5, and energy regeneration from each of the motors 3 and 5 to the battery 10 are performed via the PDU 9.

Figure 2:
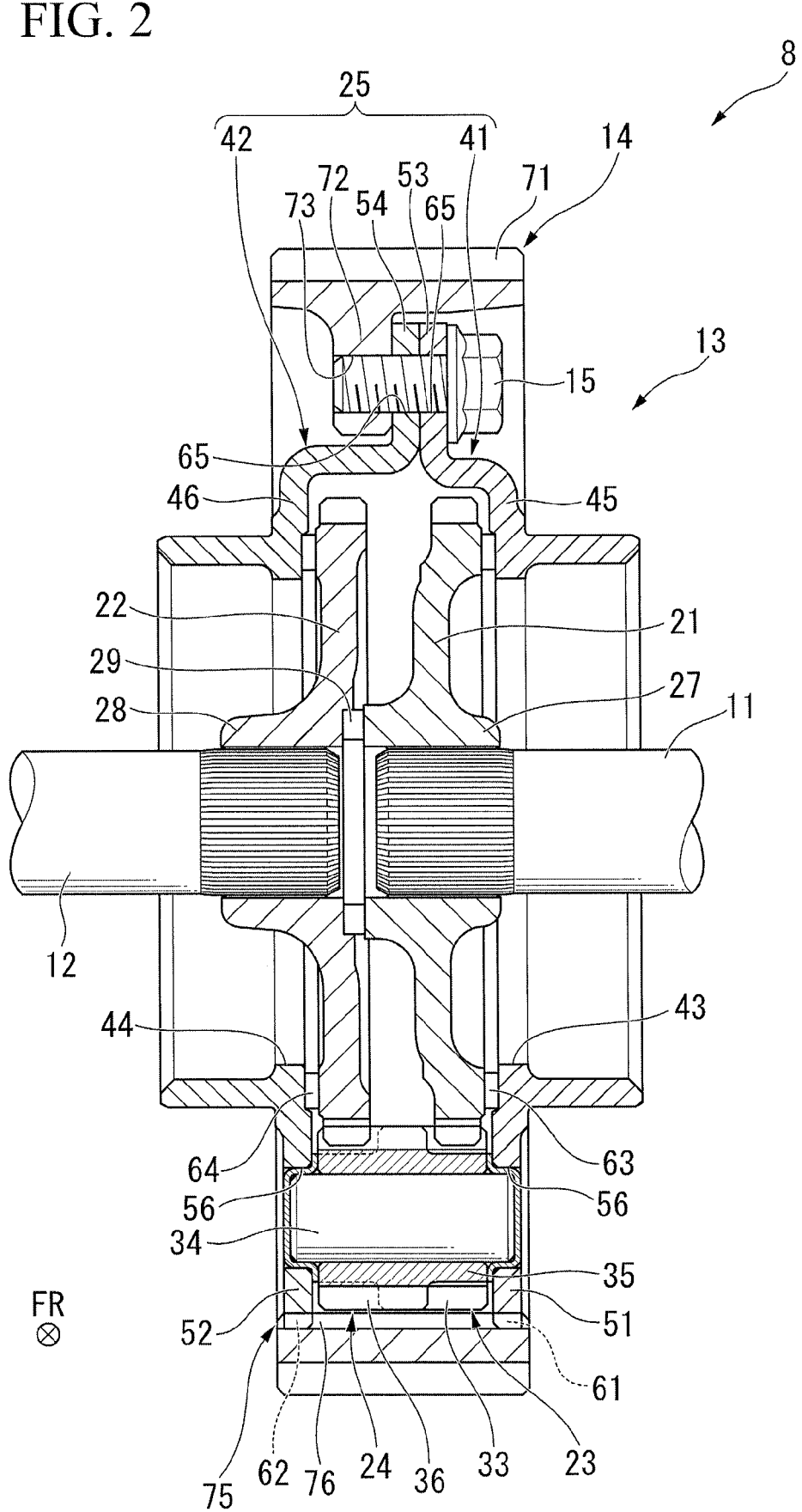
FIG. 2 is a cross-sectional view of a driving system.
Figure 3:
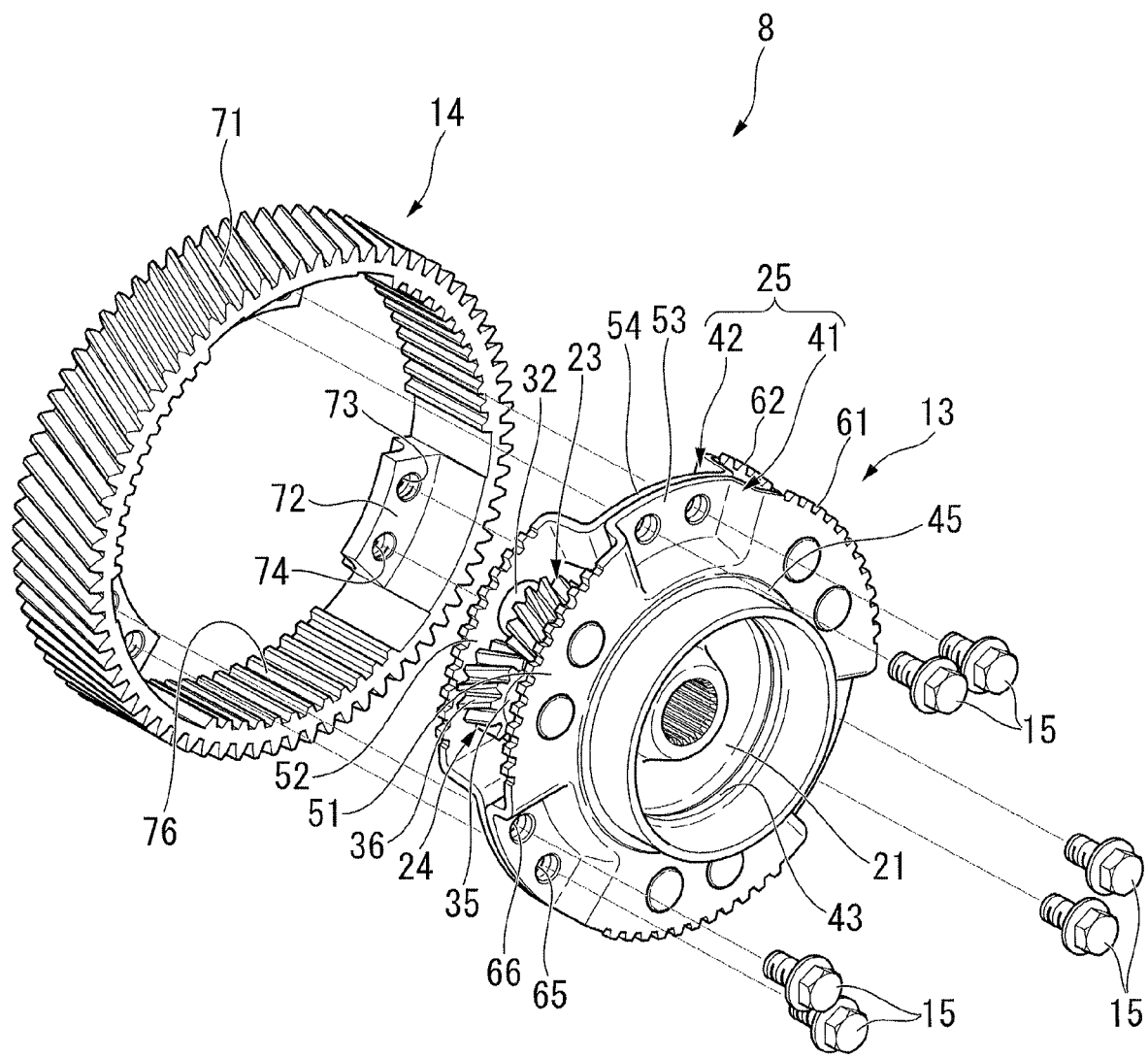
FIG. 3 is an exploded perspective view of a driving system.
Figure 4:
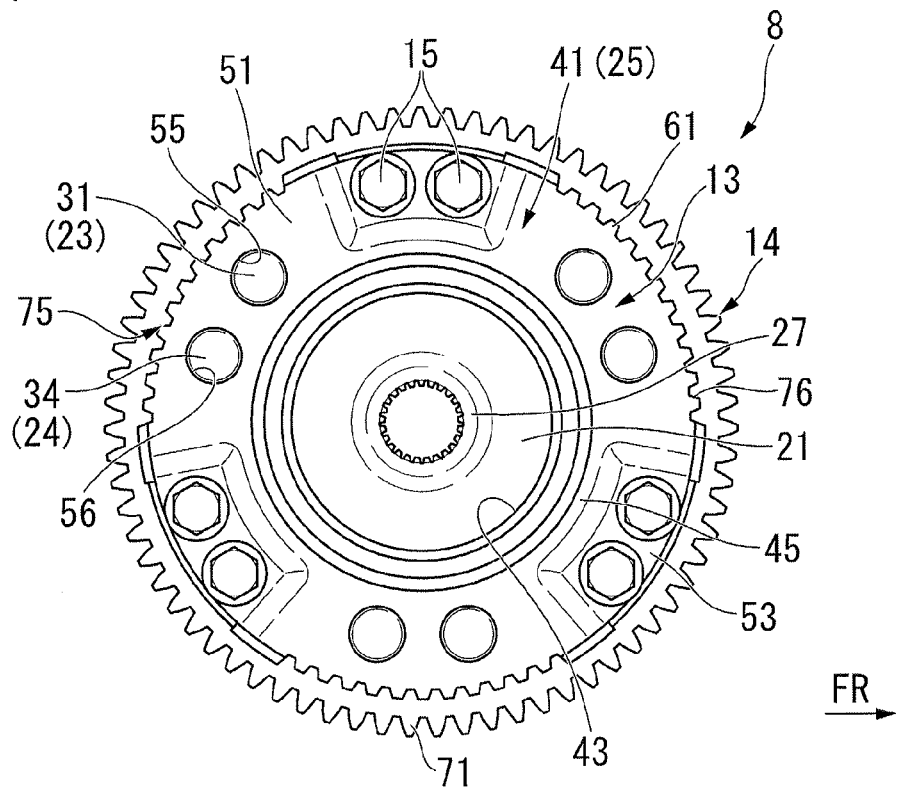
FIG. 4 is a front view of a driving system viewed from one side (right side) along the axial direction.
Figure 5:
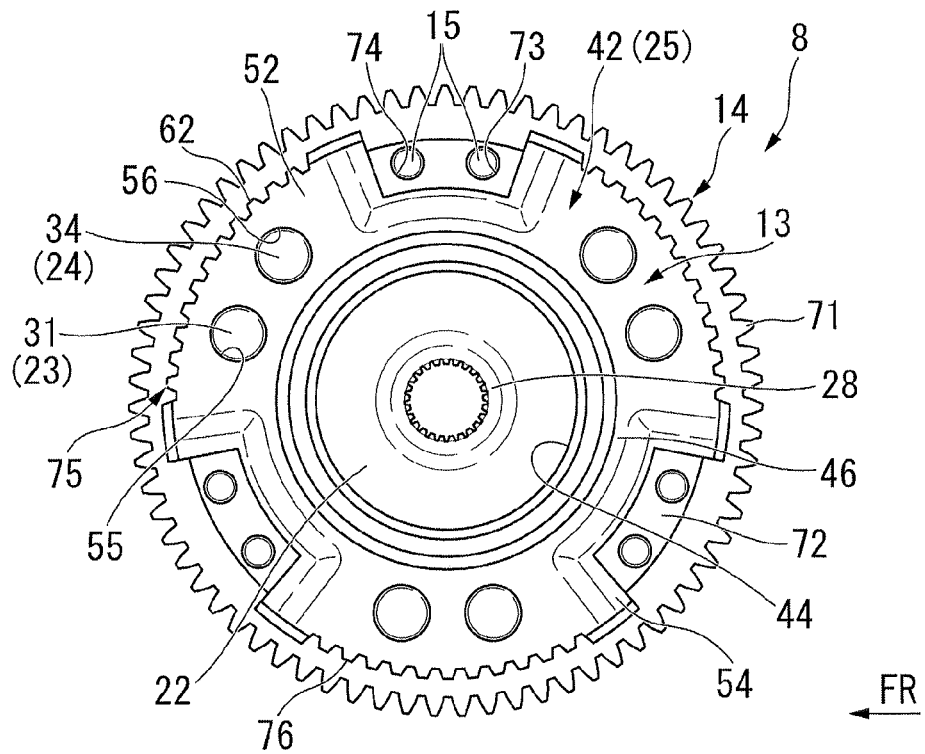
FIG. 5 is a front view of a driving system viewed from the other side (left side) along the axial direction.

FIG. 2 is a cross-sectional view of the driving system, and FIG. 3 is an exploded perspective view of the driving system. In addition, FIG. 4 is a front view of the driving system viewed from one side (right side) along the axial direction, and FIG. 5 is a front view of the driving system viewed from other side (left side) along the axial direction.

As illustrated in FIGS. 2 to 5, the driving system 8 of the present embodiment, while allowing differential motion between both axles 11 and 12 with respect to right and left axles (a first drive shaft and a second drive shaft) 11 and 12, transmits the rotation power thereof. More specifically, the driving system 8 includes the above-described right and left axles 11 and 12, a differential mechanism 13 which allows differential motion between each of the axles 11 and 12, a drive gear (drive input member) 14 which is disposed at an outside in a radial direction with respect to the differential mechanism 13 and inputs the power from the rear side motor 5 to the differential mechanism 13, and a fastening member 15 which fastens the differential mechanism 13 and the drive gear 14 together. Furthermore, in the following description, an axial direction of the axles 11 and 12 is simply referred to as an axial direction, a direction perpendicular to the axial direction is referred to as a radial direction and a direction turning around the axial direction is referred to as a circumferential direction.

(Differential Mechanism)

The differential mechanism 13 is a so-called double pinion double sun type differential mechanism that has sun gears 21 and 22, and pinion gears 23 and 24 respectively in twos. More specifically, the differential mechanism 13 includes an R side (right side) sun gear (a first sun gear) 21 fixed to a right axle 11, an L side (left side) sun gear (a second sun gear) 22 fixed to a left axle 12, an R side pinion gear (a first pinion gear) 23 engaged with the R side (right side) sun gear 21, an L side pinion gear (a second pinion gear) 24 engaged with the L side (left side) sun gear 22 and the R side pinion gear 23, and a carrier 25 that rotatably supports the R side pinion gear 23 and the L side pinion gear 24.

Each of the sun gears 21 and 22 has substantially the same shape, and is coaxially disposed along the axial direction. In addition, hub portions 27 and 28 bulging in the axial direction are respectively formed on the central portion of each of the sun gears 21 and 22 in the radial direction. End surfaces located at the inside in the axial direction in the hub portions 27 and 28 are placed to face each other in a state of pinching a washer 29 (refer to FIG. 2). Thus, relative rotation is possible and a movement in the axial direction is regulated between both sun gears 21 and 22. Then, among the respective sun gears 21 and 22, the right axle 11 is fixed to the hub portion 27 of the R side (right side) sun gear 21, and the left axle 12 is fixed to the hub portion 28 of the L side (left side) sun gear 22.

The pinion gears 23 and 24, which are formed by same shape members disposed in the mutually opposite direction and a portion of each pinion gear is engaged with the a portion of the other, configure pinion units 26 which are rotatably engaged with the respective corresponding sun gears 21 and 22. Then, a plurality of pinion units 26 are disposed in pairs around the above-described respective sun gears 21 and 22 in the circumferential direction at an interval. Furthermore, in the present embodiment, the pinion units 26 are disposed in three pairs at 120 degree intervals in the circumferential direction.

First, the R side pinion gear 23 includes a shaft portion 32 into which a pinion shaft 31 is penetrated and fixed, and a gear portion 33 which is integrally formed with the shaft portion 32 at the right end portion of the shaft portion 32. In addition, the L side pinion gear 24 includes a shaft portion 35 into which a pinion shaft 34 is penetrated and fixed, and a gear portion 36 which is integrally formed with the shaft portion 35 at the left end portion of the shaft portion 35.

The respective pinion shafts 31 and 34 are disposed in parallel along the axial direction and both end portions thereof are rotatably supported by the carrier 25.

Then, the left end portion of the gear portion 33 of the R side pinion gear 23 is engaged with the right end portion of the gear portion 36 of the L side pinion gear 24. In addition, the right end portion of the gear portion 33 of the R side pinion gear 23 is engaged with the R side (right side) sun gear 21, and the left end portion of the gear portion 36 of the L side pinion gear 24 is engaged with the L side (left side) sun gear 22, respectively. In this case, in the shaft portion 32 of the R side pinion gear 23, the L side (left side) sun gear 22 is configured so as to pass through the left end portion where the gear portion 33 does not exist, and thereby interference between the R side pinion gear 23 and the L side (left side) sun gear 22 is avoided.

Similarly, in the shaft portion 35 of the L side pinion gear 24, the R side (right side) sun gear 21 is configured so as to pass through the right end portion where the gear portion 36 does not exist, and thereby interference between the L side pinion gear 24 and the R side (right side) sun gear 21 is avoided.

(Carrier)

The carrier 25 is configured such that an R side carrier member (a first carrier member) 41 and an L side carrier member (a second carrier member) 42 are superimposed in the axial direction. The above-described respective sun gears 21 and 22 are accommodated inside the carrier members 41 and 42, and the respective pinion gears 23 and 24 are rotatably supported thereon. Furthermore, the respective carrier members 41 and 42 have substantially the same shape, and thus in the following description the respective carrier members 41 and 42 will be described together.

Each of the carrier members 41 and 42 has opening portions 43 and 44 at the center portion in the radial direction, and is an annular member coaxially disposed along the axial direction. Specifically, in the respective carrier members 41 and 42, holding portions 45 and 46 which hold the sun gears 21 and 22, shaft portions 51 and 52 which are formed around the holding portion 45 and 46 and rotatably support the pinion unit 26 (respective pinion gears 23 and 24), and fastening portions 53 and 54 which fasten both carrier members 41 and 42, and the drive gear 14 are integrally formed.

The holding portions 45 and 46 of the respective carrier members 41 and 42 are annularly faulted such that the outside diameter thereof is larger than that of the respective sun gears 21 and 22, and the inside diameter (diameter of the opening portions 43 and 44) is smaller than that of the respective sun gears 21 and 22. The respectively corresponding axles 11 and 12 are loosely inserted into the opening portions 43 and 44 of the respective holding portions 45 and 46.

In addition, the opening edge of the holding portions 45 and 46, and the outer peripheral edge of the respectively corresponding sun gears 21 and 22 are disposed at an overlapped position when viewed from the axial direction. The end surface positioned at the inner side (opposing carrier members 41 and 42 side) of the holding portions 45 and 46 in the axial direction, and the end surface positioned at the outer side (opposite side to the opposing sun gears 21 and 22) of the respective sun gears 21 and 22 in the axial direction are in contact with each other by pinching washers 63 and 64 (refer to FIG. 2). Accordingly, a relative rotation is possible and a movement in the axial direction is regulated between the R side carrier member 41 and the R side (right side) sun gear 21, and between the L side carrier member 41 and the L side (left side) sun gear 22.

Bearing portions 51 and 52 of the respective carrier members 41 and 42 are formed in a fan shape which radially extends outward in the radial direction from the outer edge of the holding portions 45 and 46. Specifically, in the present embodiment, the bearing portions 51 and 52 are disposed in three pairs at each of 120 degree intervals in the circumferential direction.

Then, between a pair of bearing portions 51 and 52 opposing each other in the axial direction between the respective carrier members 41 and 42, the above-described pinion unit 26 is accommodated for each corresponding pair. At a pair of the bearing portions 51 and 52, a pair of bearing holes 55 and 56 penetrating in the axial direction is formed side-by-side in the circumferential direction. Between the pair of the bearing portions 51 and 52, each of the bearing holes 55 and 56 is formed at the overlapped position in the axial direction. Then, the right end portions in the axial direction of the pinion shafts 31 and 34 of the each of the pinion gears 23 and 24 are respectively inserted into the respective bearing holes 55 and 56 of the R side carrier member 41, and the left end portions in the axial direction of the pinion shafts 31 and 34 of the each of the pinion gears 23 and 24 are respectively inserted into the respective bearing holes 55 and 56 of the L side carrier member 42. Thus, the respective pinion gears 23 and 24 are rotatably supported with respect to the carrier 25.

Herein, the external splines 61 and 62 are formed at a portion positioned at the bearing portions 51 and 52 along the circumferential direction among the outer peripheral edges (outer peripheral end portions) positioned at the outer side of the respective carrier members 41 and 42 in the radial direction, so as the external splines 61 and 62 are out of phase with the each of the fastening portions 53 and 54. The external splines 61 and 62 are configured such that the teeth lines extend in parallel to each other along the axial direction, and are formed throughout the axial direction within the outer peripheral edges of the bearing portions 51 and 52. In addition, the external splines 61 and 62 are formed at a portion which avoids both end portions of the outer peripheral edges of the bearing portions 51 and 52 in the circumferential direction.

The fastening portions 53 and 54 of the respective carrier members 41 and 42 includes dented portions, which are formed inward in the axial direction with respect to the holding portions 45 and 46 and the bearing portions 51 and 52, between the respectively adjacent bearing portions 51 and 52. Accordingly, a pair of the fastening portions 53 and 54 opposing each other in the axial direction is placed face-to-face between the carrier members 41 and 42, and the above-described sun gears 21 and 22 are accommodated inside in the radial direction with respect to a pair of the fastening portions 53 and 54.

A pair of through-holes 65 and 66 respectively penetrating in the axial direction is foil led side-by-side in the circumferential direction, at the respective fastening portions 53 and 54. Each of the through-holes 65 and 66 is formed at an overlapped position in the axial direction between a pair of the fastening portions 53 and 54. Then, the fastening members 15 such as bolts are inserted into the through-holes 65 and 66, and the carrier 25 is fixed to the drive gear 14 via the fastening members 15.

(Drive Gear)

The drive gear 14 is formed into a cylindrical shape with a larger diameter than the carrier 25, and the differential mechanism 13 is accommodated inside thereof. A gear portion 71 for transmitting the driving power of the above-described rear side motor 5 (refer to FIG. 1) to the carrier 25 is formed at the outer peripheral surface of the drive gear 14. The gear portion 71 is configured by a helical gear (helical gears) and connected to the rear side motor 5 via a reduction gear (not illustrated).

A plurality of mounting pieces 72 protruding inward in the radial direction is formed, leaving an interval in the circumferential direction, at the inner peripheral surface of the drive gear 14. Specifically, in the present embodiment, three mounting pieces 72 are disposed at each of 120 degree intervals in the circumferential direction, corresponding to the fastening portions 53 and 54 of the above-described carrier 25. Fastening holes 73 and 74 penetrating in the axial direction are formed side-by-side in the circumferential direction, at the mounting pieces 72.

In addition, internal splines 76 are formed between the adjacent mounting pieces 72 among the inner peripheral surface (inner peripheral end portion) of the drive gear 14 so as to be out of phase with the mounting pieces 72. The internal splines 76 are configured such that the teeth lines extend in parallel to each other along the axial direction, and are formed throughout the axial direction in the drive gear 14. In addition, the internal splines 76 are formed at a portion which avoids both end portions along the circumferential direction between the adjacent mounting pieces 72 among the inner peripheral surface of the drive gear 14.

The above-described differential mechanism 13 is inserted into the drive gear 14 from one side (for example, right side) in the axial direction with respect to the drive gear 14. More specifically, in a state where the fastening portions 53 and 54 of the carrier 25 and the mounting pieces 72 of the drive gear 14 are positioned in the circumferential direction, and the external splines 61 and 62 of the bearing portions 51 and 52 and the internal spline 76 are positioned in the circumferential direction, the differential mechanism 13 is disposed inside the drive gear 14. Then, in a state where the fastening portions 53 and 54 of the carrier 25 and the mounting pieces 72 of the drive gear 14 are placed face-to-face in the axial direction, the fastening portions 53 and 54 and the mounting pieces 72 are fastened by the fastening member 15. Furthermore, in a twisted direction of the teeth between the above-described gear portion 71 of the drive gear 14 and the reduction gear of the rear side motor 5 side, a thrust load acts toward a diving direction (axial direction) from one side (for example, right side) in the axial direction, that is, from the inserting side of the differential mechanism 13, in a state where the driving power is transmitted from the rear side motor 5 toward the drive gear 14.

In addition, a spline joint portion 75 is configured such that the external splines 61 and 62 of the respective bearing portions 51 and 52, and the internal spline 76 of the drive gear 14 are fitted into each other in a spline manner. In this case, the bearing portions 51 and 52 of the opposing carrier members 41 and 42 are disposed, leaving an interval in the axial direction. Therefore, between the respective carrier members 41 and 42, the bearing portion 51 (external spline 61) of the R side carrier member 41 is fitted into one end side (right end portion) in the axial direction within the internal spline 76, and the bearing portion 52 (external spline 62) of the L side carrier member 42 is fitted into the other end side (left end portion) in the axial direction within the internal spline 76.

In addition, the spline joint portion 75 of the present embodiment is configured so as to have an aligned large diameter, where the tooth crest of the external splines 61 and 62 comes into contact with the bottom land of the internal spline 76. Accordingly, center alignment between the drive gear 14 and the carrier 25 is performed.

(Action)

In the driving system 8 of the present embodiment, when the right axle 11 and the left axle 12 are rotated at the same rotation speed without any rotational difference, the R side (right side) sun gear 21 and the L side (left side) sun gear 22 are rotated at the same speed. Consequently, the R side pinion gear 23 and the L side pinion gear 24 do not relatively rotated (rotation) with respect to the carrier 25. In this case, the differential mechanism 13 and the drive gear 14 are integrally rotated together with the axles 11 and 12 and thereby the R side pinion gear 23 and the L side pinion gear 24 perform only the revolution with respect to the axles 11 and 12.

Accordingly, the driving power input from the rear side motor 5 to the driving system 8 can be transmitted to the right axle 11 and the left axle 12 without causing any rotational difference.

On the other hand, when the rotational difference occurs between the right axle 11 and the left axle 12, the R side (right side) sun gear 21 is rotated at the same speed as the right axle 11, and the L side (left side) sun gear 22 is rotated at the same speed as the left axle 12. Therefore, the R side pinion gear 23 and the L side pinion gear 24 are rotated in the opposite direction to each other using the engagement. That is, the each of the pinion gears, while being relatively rotated (rotation) with respect to the carrier 25 corresponding to the rotational difference between the R side (right side) sun gear 21 and the L side (left side) sun gear 22, revolve with respect to the right axle 11 and the left axle 12.

Accordingly, the driving power input from the rear side motor 5 to the driving system 8 can be transmitted to the right axle 11 and the left axle 12 while the rotational difference is caused to occur between the right axle 11 and the left axle 12.

In addition, if the rear side motor 5 is operated, the driving power input from the rear side motor 5 is decelerated by the reduction gear and then transmitted to the drive gear 14 via the gear portion 71. Then, the driving power input to the drive gear 14 acts, as a shearing force, on the spline joint portion 75 or the fastening member 15 (mainly, the spline joint portion 75), and is transmitted to the differential mechanism 13 via the spline joint portion 75 or the fastening member 15. Accordingly, the driving power transmitted to the differential mechanism 13 is transmitted to the respective axles 11 and 12 via the sun gears 21 and 22, and thereby the driving power drives the respective axles 11 and 12.

In this manner, in the present embodiment, a configuration is adopted such that the carrier 25 and the drive gear 14 are fastened by the fastening member 15, and the spline fitting is performed between the outer peripheral end portion of the carrier 25 and the inner peripheral end portion of the drive gear 14.

According to the configuration, the driving power (shearing force) acting between the carrier 25 and the drive gear 14 can be supported by the spline joint portion 75 in addition to the fastening member 15. Consequently, compared to a case where the carrier 25 and the drive gear 14 are fastened by only the fastening member 15 as in the related art, it is possible to decrease the shearing force acting on the fastening member 15.

In addition, since it is unnecessary to secure the size, the number or the like of the fastening member 15, there is no need to secure a space for disposing the fastening member 15. Therefore, weight reduction, compactness, and robust assembly of a drive input member with a carrier can be achieved.

In addition, since the fastening portions 53 and 54 are formed to be out of phase with the spline joint portion 75, compared to a case (case where an additional spline joint portion 75 is formed outward with respect to the fastening portions 53 and 54) where the fastening portions 53 and 54 are formed to be the same phase with the spline joint portion 75, it is possible to prevent an increasing size of the carrier 25 in the radial direction. Accordingly, a further compact driving system 8 can be realized.

Incidentally, if the driving power is transmitted from the rear side motor 5 to the drive gear 14, the thrust load is generated toward one side in the axial direction in the drive gear 14, that is, toward the differential mechanism 13 side. In this case, the thrust load generated in the drive gear 14 acts such that within the drive gear 14, one side in the axial direction collapses into the inner side in the radial direction, as a starting point of the mounting piece 72.

In contrast, in the present embodiment, the respective external splines 61 and 62 of the carrier members 41 and 42 are fitted into both end portions in the axial direction of the internal spline 76 of the drive gear 14 in the spline manner. Therefore, the above-described collapse in the radial direction of the drive gear 14 can be regulated. Accordingly, it is possible to suppress occurrence of deviation in engagement between the drive gear 14 and the reduction gear of the rear side motor 5 side or the like, and thereby it is possible to suppress a detrimental influence such as degradation of strength or durability, and the occurrence of sound or vibration due to the occurrence of the deviation.

In addition, in the present embodiment, the spline joint portion 75 is made to have the aligned large diameter, and center alignment of the drive gear 14 and the carrier 25 is configured to be performed by the spline joint portion 75.

According to the configuration, a separate body of a knock-pin, a positioning jig or the like in not necessary to be used in the center alignment of the drive gear 14 and the carrier 25, and it is possible to accurately assemble the drive gear 14 and the carrier 25.

Furthermore, the technical scope of the present invention is not limited to the above-described respective embodiments, and includes various modifications to the above-described embodiments without departing from the spirit of the present invention. That is, the configurations or the like exemplified in the above-described embodiment are merely a few examples, and can be appropriately modified.

For example, in the above-described embodiment, a case where the driving system 8 of the present invention is provided on the rear wheel Wr is described, but without being limited thereto, it is possible to adopt it to the front wheel Wf. In addition, the vehicle 1 is not limited to the AWD (All-Wheel-Drive) hybrid vehicle and can be appropriately selected.

In addition, in the above-described embodiment, a case where bolts are adopted to the fastening member 15 is described, but without being limited thereto, the bolts can be appropriately changed to rivets, snap-fits or the like.

Furthermore, in the above-described embodiment, a case where the spline joint portion 75 is made to have the aligned large diameter is described, but without being limited thereto, a tooth face alignment is also possible.

In addition, without departing from the scope of the present invention, configuration elements according to the above-described embodiment can be appropriately replaced by the well-known configuration elements.

What is claimed is:

1. A vehicle driving system comprising:
    a first drive shaft and a second drive shaft that are disposed on the right and left of a vehicle;
    a differential mechanism that allows a differential motion between the first drive shaft and the second drive shaft;
    a drive input member that is disposed at an outer peripheral side with respect to the differential mechanism, and inputs a power from a driving power source to the differential mechanism; and
    fastening members that fasten the differential mechanism and the drive input member together,
    wherein the differential mechanism comprises:
        a first sun gear that is connected to the first drive shaft;
        a second sun gear that is connected to the second drive shaft;
        a first pinion gear that is engaged to the first sun gear;
        a second pinion gear that is engaged to the second sun gear and the first pinion gear; and
        a carrier that is fastened to the drive input member and rotatably supports the first pinion gear and the second pinion gear, and
    wherein a spline joint portion that causes the carrier and the drive input member to be fitted in a spline manner is provided at an outer peripheral end portion of the carrier and an inner peripheral end portion of the drive input member,
    the fastening members are arranged out of phase with the spline joint portion in the circumferential direction, and
    the spline joint portion is arranged at a part of the carrier where the first pinion gear and the second pinion gear are supported by the carrier.

2. The vehicle driving system according to claim 1,
    wherein the carrier comprises a first carrier member and a second carrier member that support the first pinion gear and the second pinion gear by pinching in an axial direction,
    wherein the spline joint portion comprises:
        a internal spline that is formed at the inner peripheral end portion of the drive input member; and
        external splines that are respectively formed at outer peripheral end portions of the first carrier member and the second carrier member, and are fitted into the internal spline in the spline manner, and
    wherein one external spline among the external splines is fitted into one end side of the internal spline of the drive input member in the axial direction, and another external spline is fitted into another end side of the internal spline in the axial direction.

3. The vehicle driving system according to claim 1,
    wherein the spline joint portion has an aligned large diameter and center alignment of the drive input member and the carrier are performed by the spline joint portion.

* * * * *